(12) United States Patent
Hoffman et al.

(10) Patent No.: US 7,520,922 B2
(45) Date of Patent: Apr. 21, 2009

(54) AIR DRYER SYSTEM

(75) Inventors: Fred W. Hoffman, Columbia Station, OH (US); Leonard A. Quinn, Lagrange, OH (US); Eugene E. Clair, Willoughby Hills, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 373 days.

(21) Appl. No.: 11/240,194

(22) Filed: Sep. 30, 2005

(65) Prior Publication Data

US 2007/0084348 A1  Apr. 19, 2007

(51) Int. Cl.
*B01D 53/26* (2006.01)
(52) U.S. Cl. .............................. 96/143; 96/151; 55/417; 55/DIG. 17
(58) Field of Classification Search .................. 96/143, 96/147, 151; 55/417, 420, DIG. 17
See application file for complete search history.

(56) References Cited

U.S. PATENT DOCUMENTS

| | | | |
|---|---|---|---|
| 3,572,008 A * | 3/1971 | Hankison et al. ............... 95/105 |
| 5,002,593 A | 3/1991 | Ichishita et al. |
| 5,110,327 A | 5/1992 | Smith |
| 5,286,282 A * | 2/1994 | Goodell et al. ................ 96/113 |
| 5,286,283 A | 2/1994 | Goodell |
| 5,423,129 A | 6/1995 | Castle et al. |
| 5,522,150 A * | 6/1996 | Schultz .......................... 34/80 |
| 5,622,544 A * | 4/1997 | Shamine et al. ............... 96/134 |
| 5,685,896 A | 11/1997 | Castle et al. |
| 5,792,245 A | 8/1998 | Unger et al. |
| 5,899,435 A | 5/1999 | Mitsch et al. |
| 6,004,383 A | 12/1999 | Kuhnelt |
| 6,014,820 A | 1/2000 | Jones et al. |
| 6,089,262 A | 7/2000 | Hart |
| 6,358,291 B1 | 3/2002 | Koenig et al. |
| 2004/0016342 A1 | 1/2004 | Fornof et al. |

FOREIGN PATENT DOCUMENTS

| | | |
|---|---|---|
| DE | 19627889 A1 | 1/1998 |
| FR | 2575937 A1 | 7/1986 |
| GB | 2163366 A | 2/1986 |

OTHER PUBLICATIONS

Results of Partial International Search mailed Mar. 19, 2007 for PCT/US2006/030195.
Notification of Transmittal, the International Search Report, and the Written Opinion of the International Searching Authority for PCT/US2006/030195, mailed Jul. 12, 2007.

* cited by examiner

*Primary Examiner*—Frank M Lawrence
(74) *Attorney, Agent, or Firm*—Calfee, Halter & Griswold LLP

(57) ABSTRACT

A cartridge for an air dryer includes a desiccant volume, a desiccant in the desiccant volume for removing at least one of moisture and contaminants from air, a first passage in fluid communication with the desiccant volume and a first air storage volume, a second passage in fluid communication with the desiccant volume and in fluid communication with a second air storage volume, and a valve which, in a first position, restricts the fluid communication between the desiccant volume and the first air storage volume.

33 Claims, 4 Drawing Sheets

AIR DRYER SYSTEM

BACKGROUND

The present invention relates to air dryers. It finds particular application in conjunction with air dryers used on vehicles and will be described with particular reference thereto. It will be appreciated, however, that the invention is also amenable to other applications.

Air dryers are used, for example, on heavy vehicles for drying compressed air delivered from a compressor to a vehicle operating storage reservoir for use in operating various systems on the vehicle that utilize compressed air. One type of air dryer includes a cartridge, which includes a desiccant material through which the compressed air passes while being dried. The cartridge is secured to an air dryer housing.

As the compressor provides air during a charging cycle, the desiccant becomes saturated with moisture and other contaminants that are removed from the compressed air. At the end of the charging period, the air dryer is switched into a regeneration mode during which previously dried compressed air is purged from a regeneration storage volume and, furthermore, passes through the desiccant material. As the air from the regeneration volume passes through the desiccant, the moisture and contaminants in the desiccant are captured in the airflow and, furthermore, removed from the desiccant. The air including the moisture and contaminants is then expelled (e.g., exhausted) from the air dryer.

Although the desiccant is frequently regenerated in the manner described above, it is to be understood that the desiccant degrades over time due to the presence of contaminants (e.g., oil) in the incoming air stream. In fact, more and more residual oil and contaminants can be retained in the desiccant after each regeneration cycle. Therefore, over time, the desiccant becomes oil saturated such that it cannot be satisfactorily regenerated by the regeneration cycle described above. Although the life of the desiccant may be extended by improved purge functionality, at some point, the desiccant must be replaced.

Since dried compressed air from the previous charge cycle is used for purging the desiccant, it is to be understood that it is desirable to store the driest and cleanest air from that charge cycle in the regeneration storage volume. Because regeneration with wetter air is not as effective, it is, therefore, desirable to store the first air passing through the desiccant in the regeneration storage volume. In this case, the first air dried and cleaned by the desiccant is stored in the regeneration storage volume and, furthermore, is used for regenerating the desiccant. None of the cartridges currently known includes any means for serially directing the first air that passes through the desiccant after the regeneration mode into a regeneration storage volume prior to filling the vehicle operating storage reservoir. Therefore, none of the currently known cartridges results in the driest air being used to regenerate the desiccant during the purge cycle for more effectively recharging the desiccant.

One further advantage of including the desiccant within the cartridge is that the desiccant can be easily replaced by swapping the original cartridge for a new cartridge, which includes new desiccant. However, until now, there has not been a cost-effective way of replacing the oil fouled desiccant in a spin-on cartridge with fresh desiccant so that the cartridge can be reused.

Also, current air dryer designs typically include a flat load plate on the bottom. Because of high stresses directed on the load plate, the load plate tends to require higher thickness (e.g., at least about ¼" thickness) to prevent warping and/or failure.

SUMMARY

In one aspect, a cartridge for an air dryer includes a desiccant volume, a desiccant in the desiccant volume for removing at least one of moisture and contaminants from air, a first passage in fluid communication with the desiccant volume and a first air storage volume, a second passage in fluid communication with the desiccant volume and in fluid communication with a second air storage volume, and a valve which, in a first position, restricts the fluid communication between the desiccant volume and the first air storage volume.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
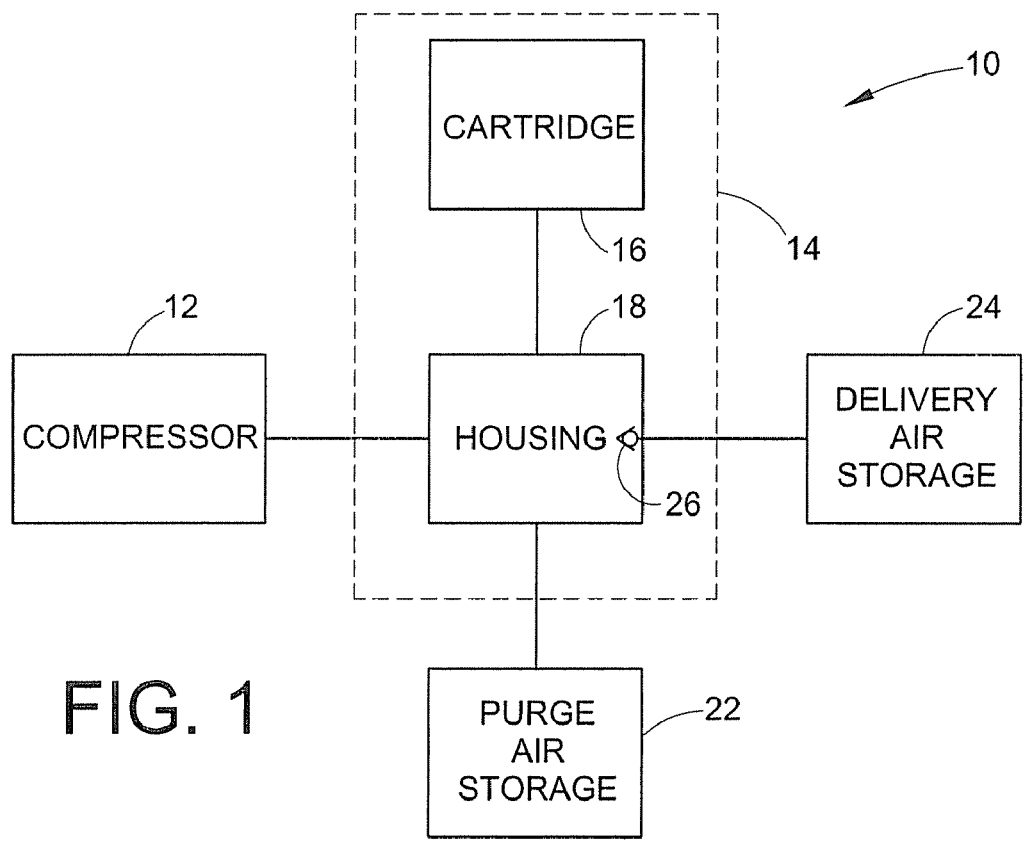
FIG. 1 illustrates an air dryer system in accordance with one embodiment of an apparatus illustrating principles of the present invention.

With reference to FIG. 1, a system 10 for drying compressed air is illustrated in accordance with one embodiment of an apparatus illustrating an aspect of the present invention. The system 10 includes a compressor 12 for supplying compressed air. The compressed air is communicated from the compressor 12 to an air dryer 14, which includes a cartridge 16 and a housing 18, which is integrally connected to the cartridge 16. The air dryer 14 variably and fluidly communicates with a purge air storage volume 22 and a delivery air storage volume 24. In one embodiment, the cartridge 16 communicates with the purge air storage volume 22 and the delivery storage volume 24 via the air dryer housing 18. A system check valve 26 (also referred to as a delivery communication valve and a delivery check valve) controls delivery of the compressed air from the air dryer 14 to the air storage volume 24. In the embodiment illustrated in FIG. 1, the system check valve 26 is located in the housing 18 of the air dryer 14. However, other embodiments are also contemplated.

Figure 2:
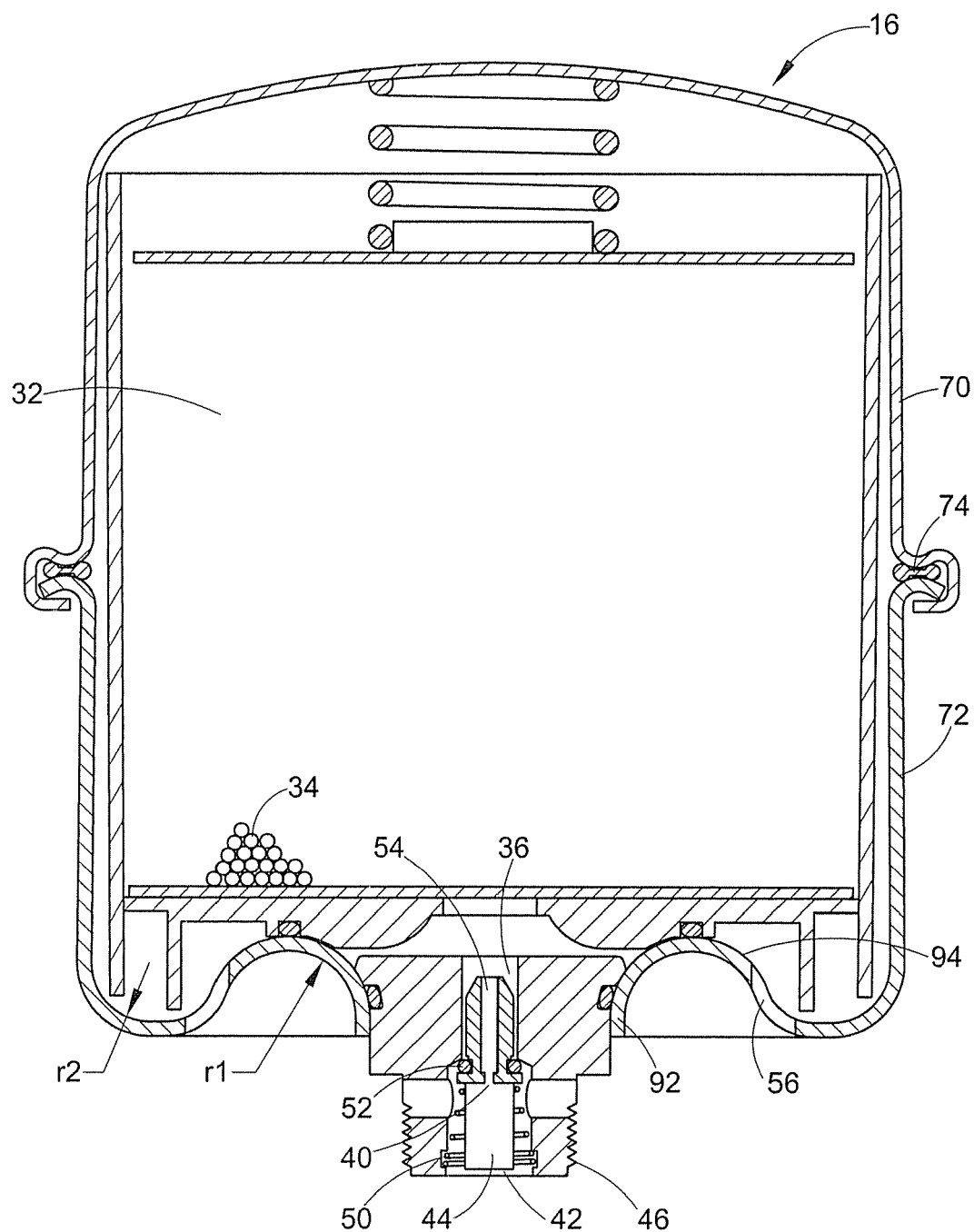
FIG. 2 illustrates an air dryer in accordance with one embodiment of an apparatus illustrating principles of the present invention.

With reference to FIGS. 1 and 2, the cartridge 16 is illustrated in accordance with one embodiment of an apparatus illustrating aspects of the present invention. The cartridge 16 includes a desiccant volume 32, which includes a desiccant material 34 for removing at least one of moisture and contaminants from the air received from the compressor 12. An exit passage 36 in the cartridge 16 fluidly communicates with the desiccant volume 32. A delivery passage 40 fluidly communicates with the desiccant volume 32 via the exit passage 36 as a function of an orifice check valve 44 (orifice communication valve). Fluid communication between a purge passage 42 and the desiccant volume 32, via the exit passage 36, is also controlled as a function of the orifice check valve 44. The purge passage 42 also fluidly communicates with the purge air storage volume 22. The respective operations of the delivery check valve 26 and the orifice check valve 44 are described in more detail below.

A threaded neck 46 (connector) is used for securing the cartridge 16 (including the desiccant volume 32) to the dryer housing 18.

In one embodiment, the delivery check valve 26 controls the fluid communication between the desiccant volume 32 and the delivery air storage volume 24 as a function of a pressure in the purge passage 42. More specifically, the delivery check valve 26 closes the fluid communication between the purge passage 42 and the delivery air storage volume 24 when a pressure in the purge passage 42 is below a delivery level (delivery enable pressure). Also, the delivery check valve 26 opens fluid communication between the purge passage 42 and the delivery air storage volume 24 when the pressure in the purge passage 42 is at least the delivery level.

In one embodiment, the orifice check valve 44 is positioned such that it controls the flow of pressurized air between the exit passage 36 and the purge passage 42. Alternatively, if the exit passage 36 and the purge passage 42 are deemed to be a single passage, the orifice check valve 44 is positioned in that single passage. A biasing means 50 (e.g., a spring) urges the orifice check valve 44 to a restricted flow (first) position, which is illustrated in FIG. 2. A sealing means 52 (e.g., an o-ring) creates a seal between the exit passage 36 and the purge passage 42 when the orifice check valve 44 is in the restricted flow position. In this position, the orifice check valve 44 provides restricted or limited fluid communication between the desiccant volume 32 and the purge air storage volume 22 via an orifice channel 54, which provides constant fluid communication between the desiccant volume 32, the purge passage 42, and the purge air storage volume 22. The orifice check valve 44 remains in the restricted flow position when a pressure in the desiccant volume 32 and, consequently, the exit passage 36 is below a purge fill level (purge enable pressure). Also, the orifice check valve 44 is set to an increased flow (second) position, when the pressure in the exit passage 36 is at least the purge fill level. While in the increased flow position, the sealing means 52 is unseated for creating additional flow communication between the exit passage 36 and the purge passage 42. Pressurized air is provided to the purge air storage volume 22 and the delivery storage volume 24 as a function of the respective positions of the orifice check valve 44 and the delivery check valve 26.

The purge fill level pressure is less than the delivery pressure. Therefore, when the exit passage 36 is between the purge fill level pressure and the delivery level pressure, the delivery check valve 26 is set to the closed position for preventing fluid communication between the exit passage 36 (and the desiccant volume 32) and the delivery air storage volume 24 while, at the same time, the orifice check valve 44 is set to the increased flow position. Once the pressure in the exit passage 36 reaches the delivery level, the delivery check valve 26 opens, and the orifice check valve 44 remains in the increased flow position. The significance of the delivery check valve and orifice check valve positions will be discussed in more detail below with respect to the operation of the air dryer system.

During operation, the air dryer system switches between a drying cycle and a regeneration (purge) cycle.

In the drying cycle, the pressurized air from the compressor 12 enters the air dryer cartridge 16 via ports 56. In one embodiment, the dryer cartridge 16 includes eight (8) ports 56; however, other embodiments in which the dryer cartridge 16 includes other numbers of ports, e.g., six (6) ports, are also contemplated. The number, location, and size of the ports are variable and are selected to provide a desired air flow while maintaining sufficient structural integrity of the cartridge. The compressed air is then communicated through the desiccant 34 in the desiccant volume 32 and into the exit passage 36. As discussed above, until the pressure in the exit passage 36 builds to the purge fill level pressure, the orifice check valve 44 remains in the restricted flow position and the delivery check valve 26 remains in the closed position. Therefore, the fluid communication of the dried and cleaned air in the exit passage 36 is restricted to flowing to the purge air storage volume 22 via only the orifice channel 54. Furthermore, the fluid communication between the exit passage 36 and the delivery air storage volume 24 is closed.

Once the pressure in the exit passage 36 raises to at least the purge fill level, but is less than the delivery level (e.g., about 115 psi), the orifice check valve 44 is set to the increased flow position while the delivery check valve 26 remains in the closed position. Therefore, the pressurized air exiting the desiccant volume 32 passes from the exit passage 36 to the purge passage 42 and the purge air storage volume 22 via the orifice check valve 44 (including the orifice channel 54). After the pressure in the purge passage 42 and the purge air storage volume 22 builds to at least the delivery pressure, the delivery check valve 26 is set for providing fluid communication between the purge passage 42 and the delivery air storage volume 24. Therefore, once the pressure in the purge passage 42 is above the delivery pressure, the orifice check valve 44 is set to the increased flow position and the delivery check valve 26 is set to the open position.

When the delivery check valve 26 is initially set to the open position (after the orifice check valve 44 was previously opened), the pressure in the purge air storage volume 22 is at about the delivery pressure. At this point, the exit chamber 36 is in fluid communication with both the purge air storage volume 22 and the delivery air storage volume 24. Therefore, the pressurized air is communicated from the exit chamber 36 to both the purge air storage volume 22 and the delivery air storage volume 24. Consequently, the pressure in the purge air storage volume 22 continues to increase as pressure builds in the delivery air storage volume 24. More specifically, the pressure in the purge air storage volume 22 continues to increase until reaching a final purge pressure level (e.g., 135 psi) and the pressure in the delivery air storage volume 24 continues to increase until reaching a final delivery pressure level (e.g., 130 psi). Other acceptable pressure levels are also contemplated depending on desired brake system operation. Because the orifice check valve 44 is set to the increased flow position before the delivery check valve 26 is set to the open position, the "first air" exiting the desiccant volume 32 is stored in the purge air storage volume 22. The "first air" refers to the first air dried by the desiccant 34 after the desiccant 34 has been regenerated (purged) as described below. It is to be understood that the first air dried by the desiccant 34 after the desiccant 34 is regenerated is typically the driest air that will exit the desiccant 34 until the desiccant is regenerated again.

Furthermore, for one example illustrating contemplated operating pressures, the delivery air storage volume 24 is at about 110 psi when the pressure in the purge passage 42 and the purge air storage volume 22 reaches a delivery air storage volume pressure (e.g., 110 psi) and the delivery check valve 26 is initially opened. The bias spring of the delivery check valve 26 between the delivery air storage volume 24 and the purge air storage volume 22 causes a pressure differential between the final purge pressure level and the final delivery pressure level, with the final purge pressure level being higher than the final delivery pressure level. For example, in one embodiment, the spring force of the bias spring results in a final purge pressure level that is about 5 psi higher than the final delivery pressure level.

Once the delivery air storage volume 24 reaches a predetermined cutoff pressure, a governor (not shown) unloads the compressor 12 so that no more pressurized air is supplied to the air dryer 14. While the compressor 12 is unloaded, the air dryer 14 may be switched into the purge cycle. During the purge cycle, a purge valve (not shown) is opened for exhausting the pressurized air in the desiccant volume 32 (and the exit passage 36) to atmosphere. Once the pressure in the desiccant volume 32 and the exit passage 36 drops below the delivery level, the delivery check valve 26 is set to the closed position for preventing fluid communication between the desiccant volume 32 and the delivery air storage volume 24. Then, after the pressure in the desiccant volume 32 drops below the purge fill level, the orifice check valve 44 also is set to the restricted flow position. Consequently, the only fluid communication between the purge air storage volume 22 and the desiccant volume 32 is via the orifice channel 54. In this mode, the previously cleaned and first dried pressurized air in the purge air storage volume 22 is communicated to the desiccant volume 32 (and atmosphere) via the orifice channel 54. The restricted airflow through the orifice channel 54 increases the time for exhausting the air in the purge air storage volume 22, which provides increased effectiveness of the purging cycle.

Figure 3:
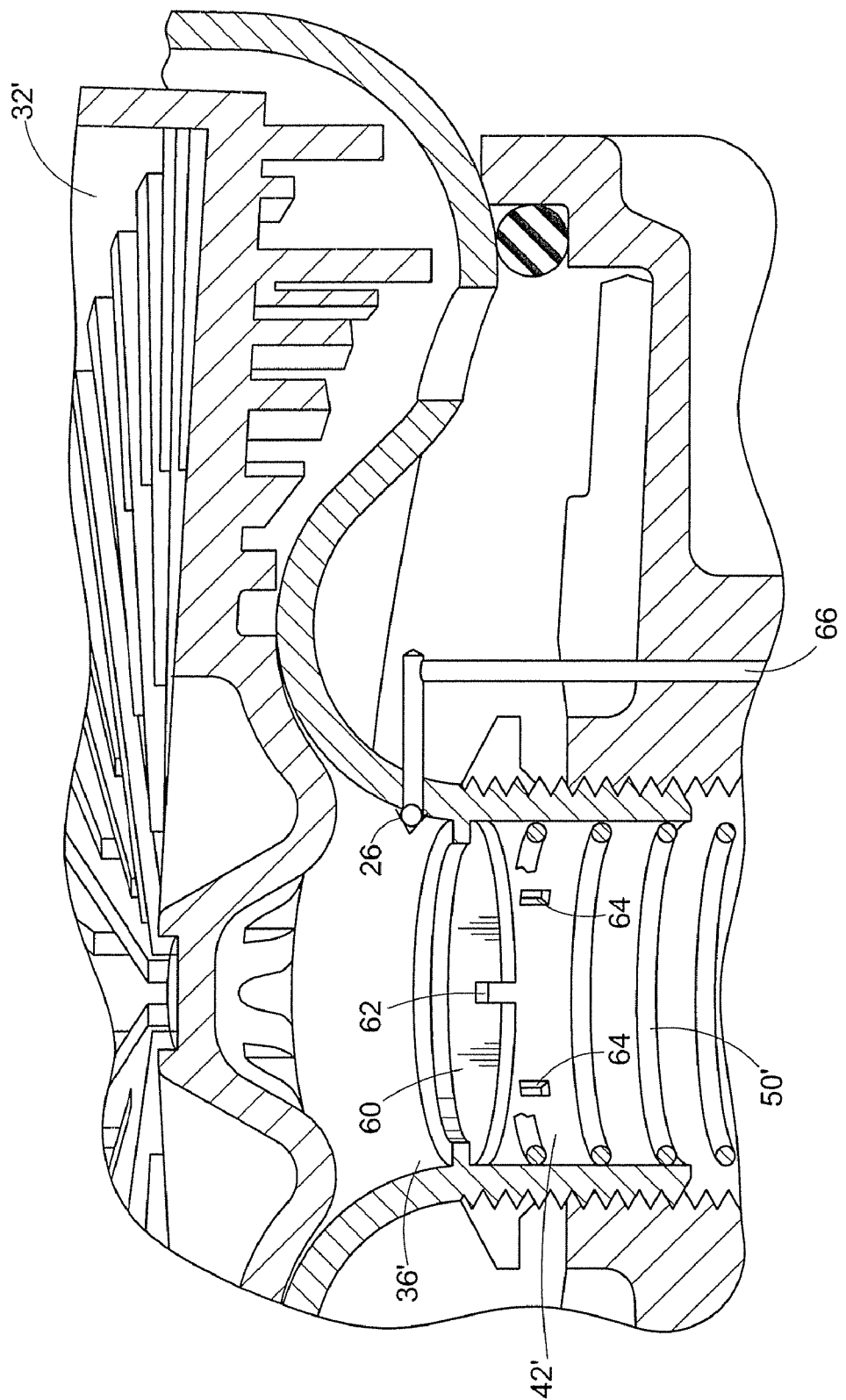
FIG. 3 illustrates an air dryer in accordance with a second embodiment of an apparatus illustrating principles of the present invention.

FIG. 3 illustrates a second embodiment of an apparatus illustrating aspects of the present invention. For ease of understanding this embodiment, like components are designated by like numerals with a primed (') suffix and new components are designated by new numerals. With reference to FIG. 3, the valve 60 that controls the fluid communication between the desiccant volume 32' and the purge air storage volume is a poppit valve that includes a channel 62. The poppit valve 60 is biased to the first (restricted flow) position, which is illustrated in FIG. 3, via the biasing means 50'. Channels 64 are formed in the wall of the exit and purge passages 36', 42', respectively. When the poppit valve 60 is in the illustrated position, the channels 64 are not utilized. However, once the pressure in the exit passage 36' reaches the purge fill level, the poppit valve 60 is moved downward and is set in the increased flow position to expose a portion of the channels 64 above the poppit valve 60 in the exit passage 36' and a portion of the channels 64 in the purge passage 42'. Once a portion of the channels is exposed, increased air delivery is achieved between the exit passage 36' and the purge air storage volume via the channels 64.

For the reasons discussed above, the orifice check valve 44 (see FIG. 2) and the poppit valve 60 (see FIG. 3) act as means for controlling the fluid communication between the desiccant volume 32, 32' and the purge air storage volume 22.

With further reference to FIG. 3, the delivery passage 66 is above the valve 60 (as opposed to the delivery passage 40 illustrated below the sealing means 52 of the orifice check valve 44 in FIG. 2). Once the pressure in the exit passage 36' reaches the purge fill level, the valve 60 is set in the increased flow position. The delivery check valve 26 remains closed until pressure in the exit passage 36' reaches the delivery pressure level. Once the pressure in the delivery passage 66 reaches the delivery pressure level, the delivery check valve 26 opens and pressurized air is passed to the delivery air storage volume via the delivery passage 66 while, at the same time, pressurized air continues to be passed to the purge air storage volume. In this embodiment, because the delivery passage 66 is above the valve 60, the final purge pressure level and the final delivery pressure level in the purge air storage volume 22 and the delivery air storage volume are substantially equal.

The delivery passage 66 is illustrated as above the valve 60 in FIG. 3 and the delivery passage 40 is illustrated as below the sealing means 52 of the orifice check valve 44 in FIG. 2. However, it is to be understood that the delivery passage 40 may be either above or below the sealing means 52 of the orifice check valve 44 (see FIG. 2). Similarly, the delivery passage 66 may be either above or below the valve 60 (see FIG. 3).

With reference again to FIG. 2, the desiccant volume 32 is defined by a desiccant housing. The desiccant housing includes a first desiccant housing portion 70 and a second desiccant housing portion 72. The first desiccant housing portion 70 removably engages the second desiccant housing portion 72. In one embodiment, the first desiccant housing portion 70 is removably deformed around the second desiccant housing portion 72 for securing the first and second desiccant housing portions 70, 72 together. In this embodiment, the first desiccant housing portion 70 frictionally engages the second desiccant housing portion 72. However, it is also contemplated to have a separate band surrounding the first and second desiccant housing portions 70, 72 to secure the first and second desiccant housing portions 70, 72 together. A seal 74 prevents pressurized air in the desiccant volume 32 from escaping to atmosphere via the engagement between the first and second desiccant housing portions 70, 72. The effectiveness of the desiccant 34 is deteriorated after becoming contaminated by oil. Therefore, at some point, it is desirable to replace the desiccant 34 in the desiccant volume 32. When it becomes desirable to replace the desiccant 34, the first desiccant housing portion 70 is removed (unsecured) from the second desiccant housing portion 72. Once the first and second housing portions 70, 72 are unsecured from each other, the desiccant 34 is accessible and, furthermore, may be replaced or reconditioned. Therefore, the first and second housing portions 70, 72 act as a means for replacing the desiccant 34 in the desiccant volume 32. Once the desiccant is replace, the first and second housing portions 70, 72 may be removably engaged to one another again.

Figure 4:
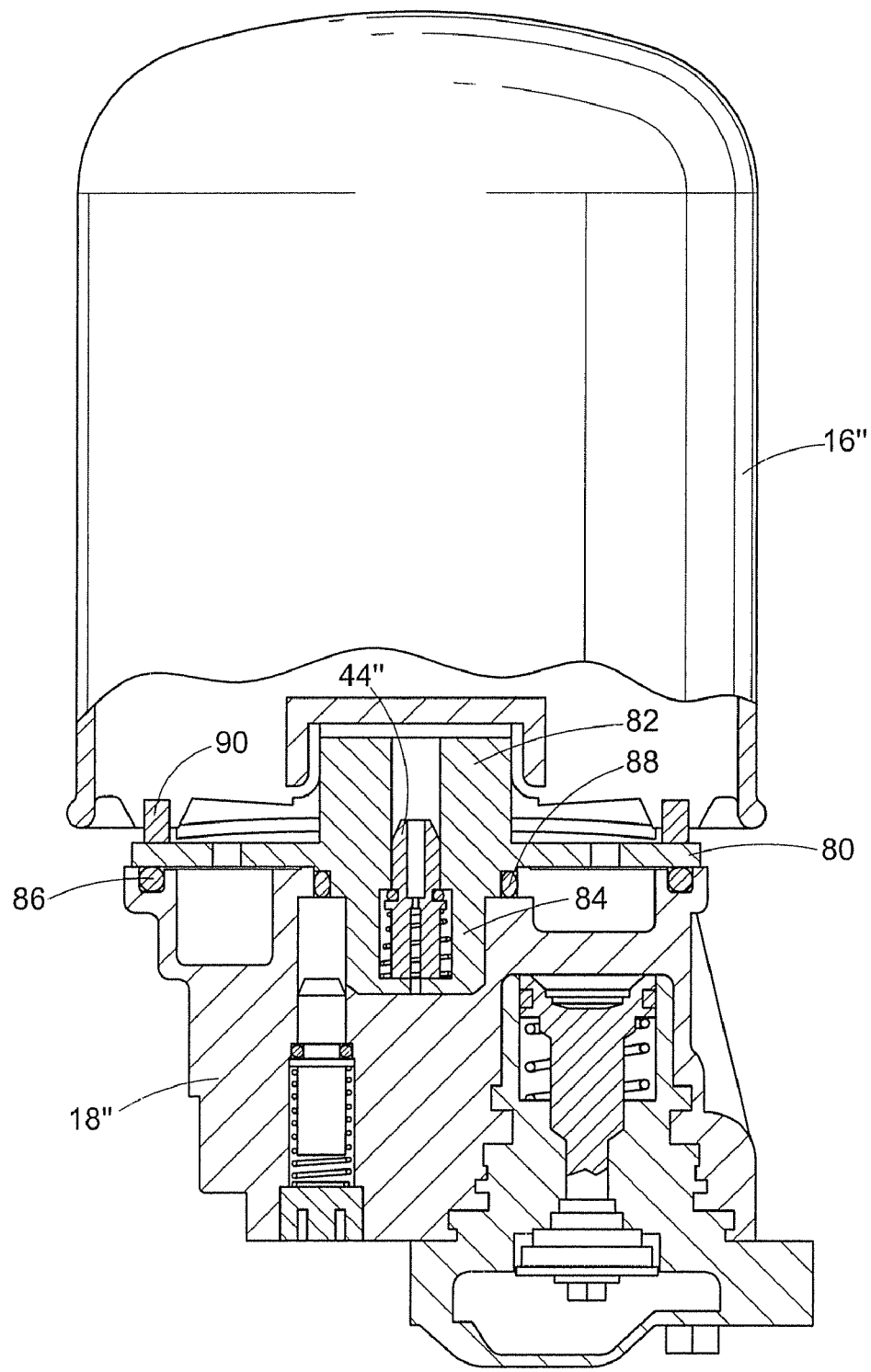
FIG. 4 illustrates an air dryer system in accordance with a third embodiment of an apparatus illustrating principles of the present invention.

FIG. 4 illustrates a third embodiment of an apparatus illustrating aspects of the present invention. For ease of understanding this embodiment, like components are designated by like numerals with a double-primed (") suffix and new components are designated by new numerals. With reference to FIG. 4, the orifice check valve 44" is included within an adapter plate 80, which is separate and discrete unit from the cartridge 16" and the housing 18". The plate 80 includes an upper connector neck portion 82 (chamber) that is sized for insertion within the cartridge 16" and a lower connector neck portion 84 that is sized for insertion into the housing 18". Sealing means 86, 88, 90 provide a seal between the cartridge 16" and the housing 18". Once the upper neck portion 82 is inserted within the cartridge 16" and the lower neck portion 84 is inserted into the housing 18", the plate 80 is secured to the cartridge 16" and the housing 18", and the orifice check valve 44" is in operative communication with the purge air storage volume 22 (see FIG. 1) and the delivery air storage volume 24 (see FIG. 1). In one embodiment, the plate 80 is threadedly secured to the cartridge 16" and the housing 18". It is to be understood that the upper and lower connector neck portions may be sized for connecting with a variety of cartridges and housings.

Figure 5:
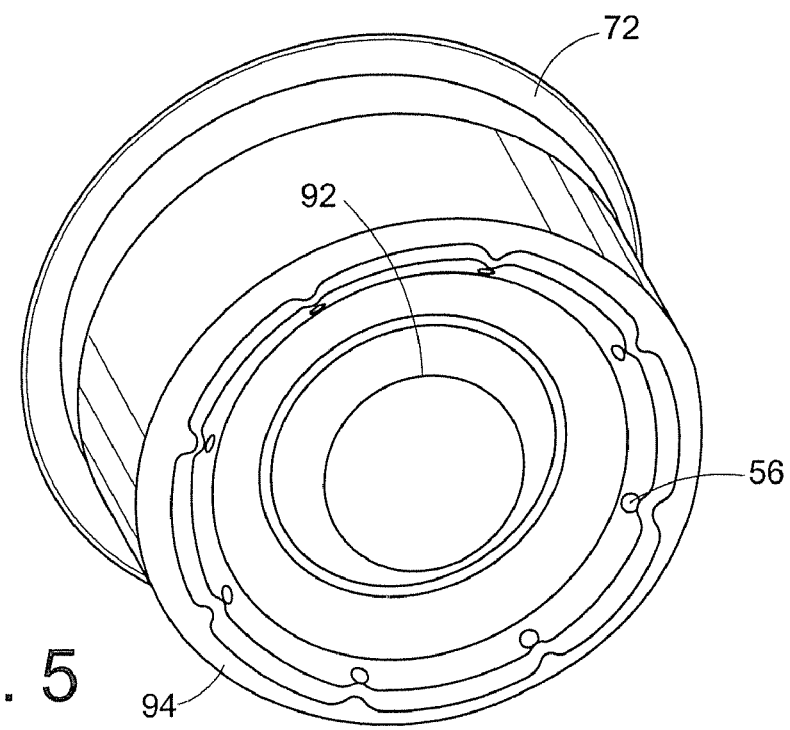
FIG. 5 illustrates a portion of a housing portion of the cartridge of FIG. 2.

With reference again to FIG. 2 and reference to FIG. 5, the second desiccant housing portion 72 of the cartridge 16 includes a bottom load region 92 having a curved portion 94. The second desiccant housing portion 72 includes a plurality of the ports 56 through which pressurized air from the compressor passes into the desiccant volume 32. As discussed above, the illustrated embodiment includes eight (8) ports 56 having a diameter of about 0.375"; however other embodiments including six (6) ports having about a 0.15" diameter are also contemplated. As stated above, the number, location, and size of the ports are variable and are selected to provide a desired air flow while maintaining sufficient structural integrity of the cartridge. In one embodiment, the ports 56 are in the curved portion 94; however, other embodiments are also contemplated. Also, in one embodiment, it is contemplated that the second desiccant housing portion 72 has a thickness of about 0.1046 inches, has a first radius r1 of about 0.47" and a second radius r2 of about 0.38". In the described embodiment, the load region 92 can tolerate about 44.2 ksi at the curved portion 94. Therefore, the curved portion 94 results in an increased load capacity of load region 92.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A cartridge for an air dryer, comprising:
   a desiccant volume;
   a desiccant in the desiccant volume for removing at least one of moisture and contaminants from air;
   a first passage in fluid communication with the desiccant volume;
   a second passage in fluid communication with the desiccant volume;
   a third passage in fluid communication with the desiccant volume, via the first passage, and in fluid communication with a delivery air storage volume, air exiting the desiccant volume being directly transmitted to one of the second passage and the third passage as a function of a pressure in the first passage; and
   a valve which, in a first position, restricts the fluid communication between the desiccant volume and the second passage, the second and third passages being located on opposite sides of the valve.

2. The cartridge for an air dryer as set forth in claim 1, wherein:
   first air exiting the desiccant volume is fluidly communicated directly to the second passage; and
   air is fluidly communicated from the first passage to the desiccant volume for regenerating the desiccant.

3. The cartridge for an air dryer as set forth in claim 1, wherein the valve is an orifice check valve.

4. The cartridge for an air dryer as set forth in claim 1, wherein the valve is a poppit valve.

5. The cartridge for an air dryer as set forth in claim 1, further including:
   a connector for securing the desiccant volume to a dryer housing.

6. The cartridge for an air dryer as set forth in claim 5, wherein:
   the connector includes a plate; and
   the valve is positioned in the plate.

7. The cartridge for an air dryer as set forth in claim 6, wherein:
   the plate is threadedly secured to the desiccant volume and the dryer housing.

8. The cartridge for an air dryer as set forth in claim 5, wherein:
   the second passage is defined within the connector; and
   the valve is secured within the connector.

9. The cartridge for an air dryer as set forth in claim 1, wherein:
   the valve is biased to the first position; and
   air in the desiccant volume pressurized above a predetermined level sets the valve to a second position, the fluid communication between the desiccant volume and the second passage being increased when the valve is in the second position.

10. The cartridge for an air dryer as set forth in claim 1, wherein the desiccant volume is defined by a desiccant housing, the desiccant housing including:
    a first desiccant housing portion; and
    a second desiccant housing portion removably secured to the first desiccant housing portion.

11. The cartridge for an air dryer as set forth in claim 1, wherein the desiccant is accessible for replacement when the second desiccant housing is removed from the first desiccant housing.

12. The cartridge for an air dryer as set forth in claim 10, wherein the first desiccant housing portion frictionally engages the second desiccant housing portion for removably securing the first desiccant housing portion to the second desiccant housing portion.

13. The cartridge for an air dryer as set forth in claim 1, wherein the valve includes:
    a valve passage, the desiccant volume restrictedly fluidly communicating with the second passage via the valve passage when the valve is in the first position.

14. An air dryer for drying compressed air, comprising:
    a desiccant volume;
    a desiccant in the desiccant volume for removing at least one of moisture and contaminants from the compressed air;
    an exit passage in fluid communication with the desiccant volume;
    a delivery passage in fluid communication with the desiccant volume, via the exit passage, and in fluid communication with a delivery air storage volume; and
    a purge passage in variable fluid communication with the desiccant volume, via the exit passage, and in fluid communication with a purge air storage volume;
    an orifice check valve which controls the variable fluid communication between the desiccant volume and the purge air storage volume via the exit passage and the purge passage, air exiting the desiccant volume being directly transmitted to one of the delivery passage and the purge passage as a function of a pressure in the purge air storage volume, the delivery desiccant and the purge desiccant being located on opposite sides of the orifice check valve; and a delivery check valve for controlling variable fluid communication between the desiccant volume and the delivery air storage volume.

15. The system for drying compressed air as set forth in claim 14, wherein the delivery check valve also controls the fluid communication between the desiccant volume and the delivery air storage volume as a function of a pressure in the purge passage.

16. The system for drying compressed air as set forth in claim 14, wherein:
the delivery check valve closes the fluid communication between the desiccant volume and the delivery air storage volume when a pressure in the exit passage is below a delivery level;
the air exiting the desiccant volume is communicated to the purge air storage volume when the pressure in the exit passage is below the delivery level; and
the air exiting the desiccant volume is communicated to the delivery air storage volume when the pressure in the exit passage is at least the delivery level.

17. The system for drying compressed air as set forth in claim 16, wherein:
the orifice check valve is set for restricted fluid communication between the desiccant volume and the purge air storage volume when a pressure in the exit passage is below a purge fill level, the purge fill level being less than the delivery level; and
the orifice check valve is set for fluid communication in addition to the restricted fluid communication between the desiccant volume and the purge air storage volume when a pressure in the exit passage is at least the purge fill level.

18. The system for drying compressed air as set forth in claim 17, wherein during a purge cycle of the air dryer:
the pressure in the desiccant volume and the exit passage drops below the purge fill level; and
the pressurized air in the purge air storage volume restrictively passes to the desiccant volume for purging the desiccant.

19. The system for drying compressed air as set forth in claim 17, wherein:
a channel in a wall of at least one of the exit passage and the purge passage permits the additional fluid communication between the desiccant volume and the purge air storage volume when the orifice check valve is not set for the restricted fluid communication.

20. The system for drying compressed air as set forth in claim 14, wherein the orifice check valve includes an orifice channel providing constant fluid communication between the desiccant volume and the purge air storage volume.

21. The system for drying compressed air as set forth in claim 14, wherein:
the desiccant volume includes a first desiccant housing portion removably secured to a second desiccant housing portion; and
the desiccant is accessible for replacement when the second desiccant housing is unsecured from the first desiccant housing.

22. The system for drying compressed air as set forth in claim 14, wherein:
the orifice check valve is integral with the air dryer.

23. The system for drying compressed air as set forth in claim 14, further including:
a housing connected to the air dryer, the delivery passage being located in a wall of the housing.

24. The system for drying compressed air as set forth in claim 14, wherein:
the orifice check valve is included within a discrete unit that is connected to the air dryer and a housing.

25. The system for drying compressed air as set forth in claim 14, wherein:
the delivery passage and the purge passage are located on a common side of the orifice check valve.

26. A cartridge for an air dryer, comprising:
a desiccant volume defined by a desiccant housing, the desiccant housing including:
a first desiccant housing portion; and
a second desiccant housing portion removably secured to the first desiccant housing portion;
a desiccant in the desiccant volume for removing at least one of moisture and contaminants from air;
a first passage in fluid communication with the desiccant volume;
a second passage in variable fluid communication with the desiccant volume;
a third passage in fluid communication with the desiccant volume, via the first passage and in fluid communication with a delivery air storage volume, air exiting the desiccant volume being directly transmitted to one of the second passage and the third passage; and
a valve for controlling the fluid communication between the desiccant volume and the second passage as a function of a pressure in the desiccant volume, the second and third passages being located on opposite sides of the valve.

27. The cartridge for an air dryer as set forth in claim 26, further including:
a band securing the desiccant housing portions together.

28. The cartridge for an air dryer as set forth in claim 26, further including:
a seal between the first and second desiccant housing portions.

29. A cartridge for an air dryer, comprising:
a desiccant volume;
a desiccant in the desiccant volume for removing at least one of moisture and contaminants from air;
a first passage in fluid communication with the desiccant volume;
a second passage in variable fluid communication with the desiccant volume;
a third passage in fluid communication with the desiccant volume, via the first passage, and in fluid communication with a delivery air storage volume; and
means for transmitting air exiting the desiccant volume directly to one of the second passage and the third passage as a function of a pressure in the first passage, the second and third passages being located on opposite sides of the means for transmitting.

30. The cartridge for an air dryer as set forth in claim 29, wherein the means for transmitting includes:
a valve for controlling the fluid communication between the desiccant volume and the second passage as a function of a pressure in the desiccant volume.

31. A cartridge for an air dryer, comprising:
a desiccant volume;
a desiccant in the desiccant volume for removing at least one of moisture and contaminants from air;
a first passage in fluid communication with the desiccant volume;
a second passage in fluid communication with the desiccant volume, air exiting the desiccant passing directly to one of the first passage and the second passage;

an orifice check valve which, in a first position, restricts the fluid communication between the desiccant volume and the first and second passages, the first and second passages being located on opposite sides of the orifice check valve; and a delivery check valve, a position of the delivery check valve controlling fluid communication between the desiccant volume and the second passage, the first air exiting the desiccant volume passing directly to the first passage as a function of the position of the orifice check valve and the position of the delivery check valve.

32. The cartridge for an air dryer as set forth in claim 31, wherein:

air is communicated from the first passage to the desiccant volume for regenerating the desiccant.

33. The cartridge for an air dryer as set forth in claim 32, wherein:

air is communicated from the first passage to the desiccant volume when the orifice check valve is in the first position.

* * * * *

UNITED STATES PATENT AND TRADEMARK OFFICE
CERTIFICATE OF CORRECTION

| | | |
|---|---|---|
| PATENT NO. | : 7,520,922 B2 | Page 1 of 1 |
| APPLICATION NO. | : 11/240194 | |
| DATED | : April 21, 2009 | |
| INVENTOR(S) | : Fred Hoffman et al. | |

It is certified that error appears in the above-identified patent and that said Letters Patent is hereby corrected as shown below:

In the claims,
Column 8, line 31, claim 11 cancel the text "as set forth in claim 1" and insert --as set forth in claim 10--.

Column 8, lines 65-66, claim 14 cancel the text "the delivery desiccant and the purge desiccant" and insert --the delivery passage and the purge passage--.

Signed and Sealed this

Twenty-first Day of September, 2010

David J. Kappos
*Director of the United States Patent and Trademark Office*